United States Patent [19]
Schauer

[11] 3,878,079
[45] *Apr. 15, 1975

[54] METHOD OF PRODUCING THIN TANTALUM FILMS

[75] Inventor: Alois Schauer, Gruenwald, Germany

[73] Assignee: Siemens Aktiengesellschaft, Berlin and Munich, Germany

[ * ] Notice: The portion of the term of this patent subsequent to Apr. 30, 1991, has been disclaimed.

[22] Filed: Mar. 23, 1973

[21] Appl. No.: 344,194

[30] Foreign Application Priority Data
Mar. 28, 1972 Germany............................ 2215151

[52] U.S. Cl................................. 204/192; 204/298
[51] Int. Cl............................................. C23c 15/00
[58] Field of Search.................................... 204/192

[56] References Cited
UNITED STATES PATENTS
3,258,413  6/1966  Pendergast........................... 204/192
3,395,089  7/1968  Mayer et al........................ 204/192

Primary Examiner—O. R. Vertiz
Assistant Examiner—Wayne A. Langel
Attorney, Agent, or Firm—Hill, Gross, Simpson, Van Santen, Steadman, Chiara & Simpson

[57] ABSTRACT

Thin films of tantalum in the $\alpha$ phase body-centered cubic lattice are produced by heating a substrate to a temperature above 300° C. and applying a high frequency discharge to a tantalum target member. The sputtering atmosphere is adjusted so as to contain a sputtering gas (i.e., argon) at a pressure of $1.5 \times 10^{-3}$ Torr and a reactive gas (i.e., oxygen) at a partial pressure below $10^{-6}$ Torr. The resultant films have a specific resistance of about $25\mu\Omega\text{cm}$ and a temperature coefficient of about +1500 ppm/°C. so as to be particularly useful as initial films in thin-film electronic circuits.

5 Claims, 3 Drawing Figures 3,878,079

METHOD OF PRODUCING THIN TANTALUM FILMS

BACKGROUND OF THE INVENTION

1. Field of the Invention

The invention relates to production of tantalum films and more particularly to production of extremely pure thin films of tantalum in the α-phase body-centered cubic lattice by cathode sputtering.

2. Prior Art

In the production of thin-layer electronic circuits, tantalum is often utilized as a layer-forming material. Generally, such layers are produced by cathode sputtering and by suitable selection of sputtering parameters, films can be produced for use in resistors, conductor paths, or capacitors. For example, by thermal oxidation or anodization, tantalum metal is converted into non-conductive tantalum oxide which is suitable as a protective film against atmospheric conditions and/or as a capacitor dielectric.

Sputtered tantalum is known in two different phases or forms. The earliest known phase is the so-called α-tantalum which possesses a body centered cubic lattice. Since 1965, the so-called β-tantalum has been known and is characterized by a tetragonal lattice. β-tantalum has a relatively high resistivity of about 200 μ200μΩcm and a temperature coefficient of resistance of −100 ppm/°C. β-tantalum is produced when the pressure of the reactive gases in the sputtering chamber is kept low during the sputtering operation.

Thin-film capacitors should meet two conditions: the material utilized as the electrodes should have a low resistance and the oxide which is utilized as a dielectric should have a high insulation resistance value. These two conditions are not met by either of the known tantalum phases. While it is true that β-tantalum oxide is useful as a dielectric, β-tantalum itself has a relatively high resistance; similarly, the known α-tantalum thin films have a relatively low resistance but their oxide is not well suited for use as a capacitor dielectric.

Studies of prior art tantalum phases have shown that relatively large amounts of reactive gases are incorporated into the metal lattice of known α-tantalum. Apparently, the inclusion of such large amounts of reactive gases interferes with the formation of a suitable oxide layer.

In my copending U.S. Ser. No. 232,373, filed Mar. 7, 1972, I disclosed and claimed the cathode sputtering process for the production of thin films of tantalum in the α-phase whereby exceptionally pure and low resistance tantalum films are produced that are useful in thin-film electronic circuits. Generally, the claimed process involves coating a substrate whose surface is free from absorbed atoms by the use of an electrodeless ring discharge plasma in sputtering atmosphere which contains a very small amount of reactive gases.

SUMMARY OF THE INVENTION

The invention provides a method of producing thin-films of tantalum in the α-phase body-centered cubic lattice by sputtering tantalum in a cathode sputtering apparatus with a high frequency discharge. A glass substrate is heated to a temperature above 300° C. and the sputtering atmosphere is adjusted so as to contain an amount of a sputtering gas at a pressure of about $1.5 \times 10^{-3}$ Torr and a reactive gas at a partial pressure below $10^{-6}$ Torr.

DESCRIPTION OF THE PREFERRED EMBODIMENTS

The tantalum films produced in accordance with the principles of the invention are very pure and have substantially no foreign gas or gas atoms incorporated within the lattice thereof. Such pure tantalum layers are characterized by a low specific resistance and are exceptionally suitable as initial materials in thin-film electronic circuits. The temperature coefficient of resistance (TCR) is relatively high at about +1500 ppm/°C. and the resistivity ($\rho$) is about 20 to 25 μΩcm.

In accordance with the principles of the invention, the sputtering atmosphere within a cathode sputtering apparatus is adjusted so as to contain a sputtering gas, for example, argon, although other noble gases might also be utilized at a pressure of about $1.5 \times 10^{-3}$ Torr and one or more reactive gases, such as oxygen, nitrogen, mixtures thereof, etc., at a partial pressure below $10^{-6}$ Torr. If the partial pressure of the reactive gas is above this value, β-tantalum is deposited and this phenomenon has been described in the literature.

The substrate on which the deposition of pure tantalum is to take place is pre-heated to a temperature of above 300° C. In preferred embodiments, the substrate surface receiving the pure tantalum is coated with $Ta_2O_5$, since such surfaces are more easily cleansed of absorbed atoms which hinder the formation of highly pure α-phase tantalum.

The tantalum target material is supplied with a high frequency power, that is, with a high voltage at a high frequency so that sputtering of tantalum occurs.

In preferred embodiments of the invention, a preliminary sputtering is carried out prior to the actual film deposition. Such a pre-sputtering step cleans the target member. Further, because of the known gettering effects of tantalum, the sputtering atmosphere is further adjusted by the removal of the active gases.

In certain embodiments, a d.c. magnetic field is axially disposed between the anode and cathode of the sputtering chamber in order to strengthen the sputtering plasma. Such magnetic field causes electrons and ions to follow in helical paths in their travel from anode to cathode and thereby increase the number of ionized gas atoms within the plasma.

Figure 1:
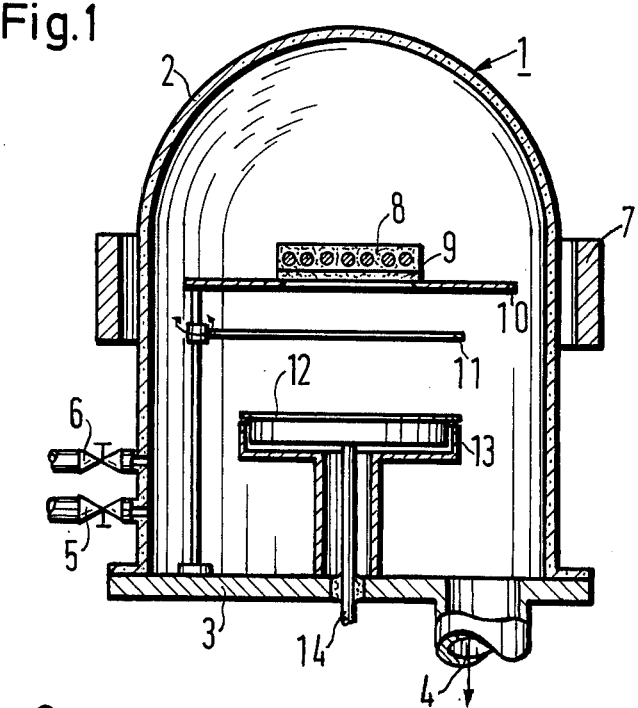
FIG. 1 is a diagrammatical view of an apparatus useful in carrying out the invention.

Referring now to FIG. 1, a cathode sputtering apparatus 1 suitable for the production of pure tantalum film in accordance with the invention is illustrated. The vacuum chamber 2 composed of a non-magnetic material, is disposed on a base plate 3. The base plate 3 is provided with an aperture 4 for interconnecting the interior of chamber 2 with a vacuum pump (not shown). The chamber 2 is provided with an inlet for a select sputtering gas (e.g. argon) controlled by a valve means 5 and an inlet for a reactive gas (e.g., oxygen) controlled by a second valve means 6. In the embodiment illustrated, a magnetic coil 7, encompasses the chamber 2 and is connected to a suitable d.c. source (not shown) so as to produce an axially disposed magnetic field which strenghten the sputtering plasma within chamber 2. Mounted on the interior of the chamber 2 is a heating means 8 and a base electrode 10. The substrate 9 is mounted on the base electrode 10 and in contact with the heating means 8 so that the substrate can be intensely heated before and during the sputtering process. The target member 12, composed of pure tantalum, is mounted so as to face an exposed surface of the substrate 9. A movable diaphragm member 11 is mounted between the target member 12 and the substrate so that during preliminary sputtering operation, the diaphragm member 11 may be moved in position to block tantalum from being deposited on the substrate. A screen member 13 is provided on the backside of target member 12, i.e., away from substrate 9. A suitable high frequency voltage source (not shown) is interconnected with target member 12 via conduit 14.

Figure 2:
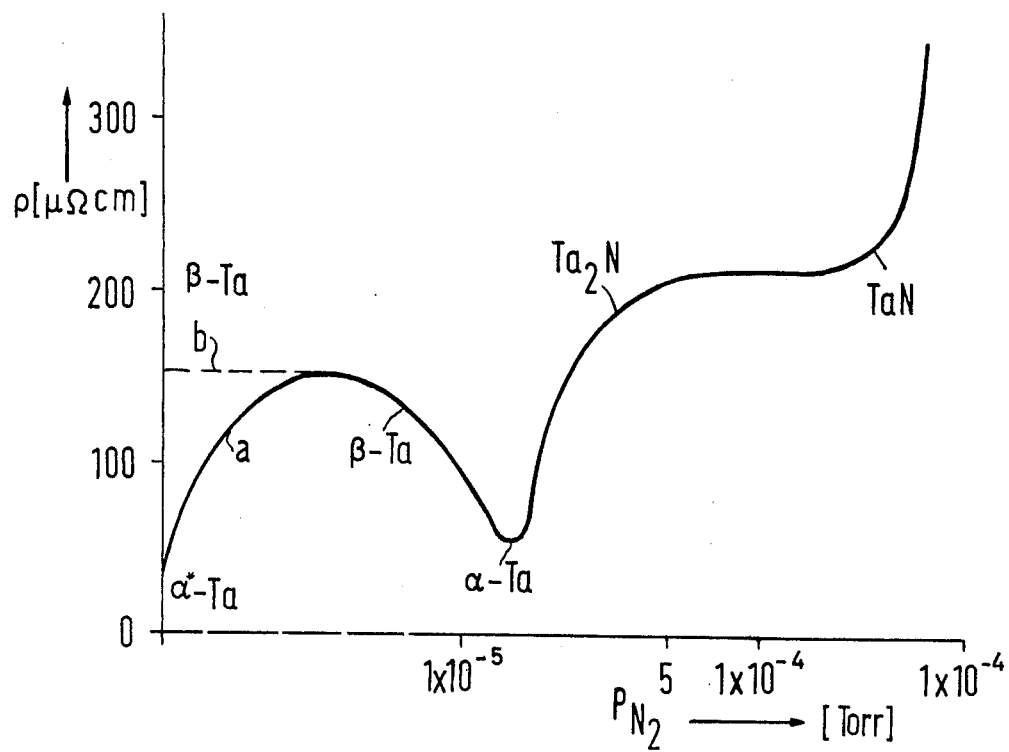
FIG. 2 is a graphic illustration showing the resistivity of sputtered tantalum films as a function of nitrogen partial pressure.
Figure 3:
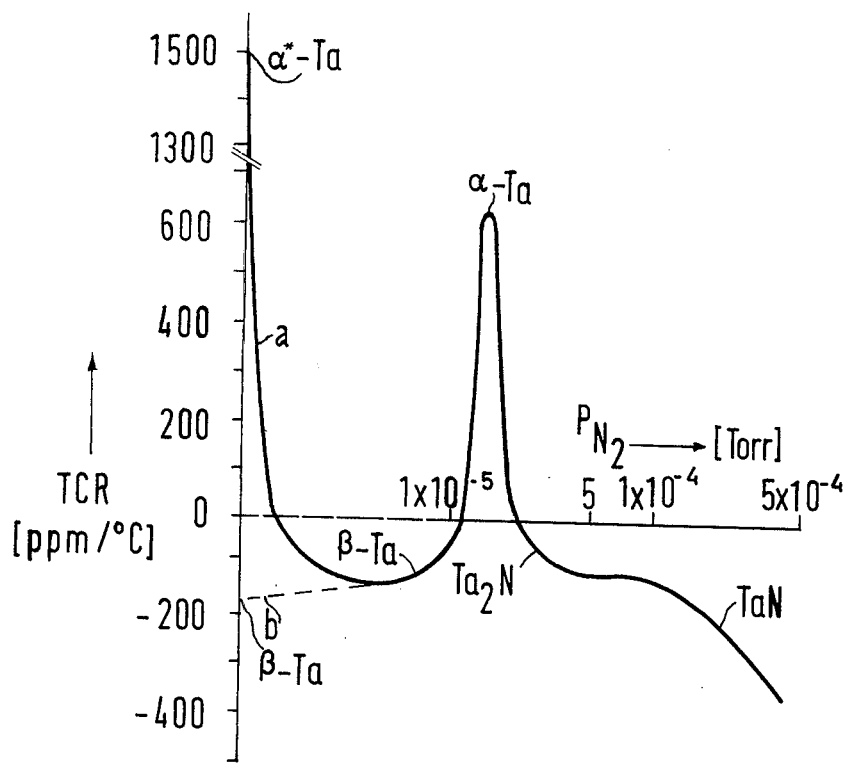
FIG. 3 is a graphic illustration showing the relation between temperature coefficient of resistance of sputtered tantalum films and nitrogen partial pressure.

As an exemplary embodiment of the invention utilizing a sputtering device similar to that illustrated at FIG. 1, argon, having a purity of 99.999% was introduced within the interior of a sputtering chamber at a pressure of $1.5 \times 10^{-3}$ Torr. In the cases of FIG. 2 and 3, a selected amount of a reactive gas, such as nitrogen, was also introduced within the interior of the chamber through a valve means. After the substrate was mounted on the base electrode, the distance between the target member 12 and the substrate 9 was about 4 cm. The high frequency voltage was applied to the target member and comprised about 2.5 kV at 27 MHz and a current of about 0.6 A.

Before the substrate 9 was mounted within the sputtering chamber it was cleaned. It is extremely important that a thorough cleaning process be carried out prior to sputtering. An exemplary cleaning process consists of cleaning a glass substrate in an ultrasonic bath, boiling such substrate in hydrogen peroxide, and washing it in deionized water.

The heating member was activated so as to heat the substrate within the sputtering chamber to a temperature above 300°C. Then, a pre-sputtering process was effected for a half hour, with the diaphragm member 11 in blocking position. Thereafter, the diaphragm was moved to expose the free surface of the substrate and sputtering begun. Layers of pure α-phase tantalum of 100 to 400 nm in thickness were deposited at a rate of about 14 nm per minute.

FIG. 2 illustrates resistivity ($\rho$) of various tantalum films as a function of nitrogen partial pressure ($P_{N2}$) in the sputtering atmosphere. It will be noted that by decreasing nitrogen partial pressure, TaN, $Ta_2N$ and finally α-tantalum are successively formed. However, this known α-tantalum is still relatively highly doped with foreign gases. With a further reduction of the amount of nitrogen in the sputtering atmosphere, β-tantalum is deposited. The resistivity of β-tantalum is about 160 μΩcm. With a still further reduction in the amount of nitrogen within the sputtering atmosphere, the illustrated curve splits into two branches, $a$ and $b$. Curve $b$ is abtained when the substrates are not preheated at temperatures above 300°C and βtantalum is deposited. Curve $a$ is abtained in accordance with the principles of the invention when a cathode sputtering apparatus with a high frequency discharge is used, when the partial pressure of the reactive gas or gases in the sputtering atmosphere ist less than $10^{-6}$ Torr, and the substrate ist heated above 300°C. The highly pure α-phase tantalum obtained, is here designated α*-tantalum. The specific resistance of α*-tantalum produced in accordance with the invention is 20 to 25 μΩcm whereas previously known α-tantalum films produced by cathode sputtering have a resistivity of about 50 μΩcm.

FIG. 3 illustrates the temperature coefficient of electrical resistance (TCR) of various tantalum films deposited by cathode sputtering in relation to nitrogen partial pressure ($P_{N2}$) in the sputtering atmosphere. Again, the illustrated curve is split up into two branches $a$ and $b$. The α*-tantalum produced by the method of the invention possesses a TCR of about +1500 ppm/°C while a film of the β-phase formed on substrates heated below 300°C has a TCR ranging between about −150 to −200 ppm/°C.

As is apparent from the foregoing specification, the present invention is susceptible of being embodied with various alterations and modifications which may differ particularly from those that have been described in the preceding specification and description. For this reason, it is to be fully understood that all of the foregoing is intended to be merely illustrative and is not to be construed or interpreted as being restrictive or otherwise limiting of the present invention, excepting as set forth and defined in the hereto-appended claims.

I claim as my invention:

1. A method of producing thin-film tantalum in the α-phase body-centered cubic lattice with a cathode sputtering apparatus including a sputtering chamber containing a sputtering atmosphere and a tantalum target member, comprising:

heating a glass glazed or ceramic substrate positioned within the chamber so as to have a surface thereof exposed to the target member to a temperature above 300°C, adjusting the sputtering atmosphere so that it contains a given amount of a sputtering gas and a much smaller amount of a reactive gas, applying a high frequency discharge to the target member so that sputtering occurs, and depositing relatively pure tantalum in α-phase body-centered cubic lattice on the exposed surface of said substrate.

2. A method as defined in claim 1 wherein the sputtering gas is argon and is present in the sputtering atmosphere in an amount sufficient to produce a pressure of $1.5 \times 10^{-3}$ Torr and the partial pressure of reactive gas in said sputtering atmosphere is below $10^{-6}$ Torr.

3. A method as defined in claim 1 wherein a pre-sputtering is effected prior to the deposition of relatively pure tantalum in α-phase body centered cubic lattice on the substrate.

4. A method as defined in claim 1 wherein the exposed surface of the substrate is coated with $Ta_2O_5$.

5. A method as defined in claim 1 wherein a magnetic d.c. field is axially disposed between the target member and the substrate.

* * * * *